(12) United States Patent
Vanderpool (10) Patent No.: US 7,988,830 B2
(45) Date of Patent: Aug. 2, 2011

(54) WASTE PROCESSING PROCESS USING ACID

(76) Inventor: Warren Vanderpool, Auburn, NY (US)

( * ) Notice: Subject to any disclaimer, the term of this patent is extended or adjusted under 35 U.S.C. 154(b) by 248 days.

(21) Appl. No.: 12/189,719

(22) Filed: Aug. 11, 2008

(65) Prior Publication Data

US 2009/0120778 A1    May 14, 2009

Related U.S. Application Data

(60) Provisional application No. 60/955,114, filed on Aug. 10, 2007, provisional application No. 60/986,372, filed on Nov. 8, 2007, provisional application No. 61/048,006, filed on Apr. 25, 2008, provisional application No. 61/047,993, filed on Apr. 25, 2008.

(51) Int. Cl.
*C10B 51/00* (2006.01)
*C07C 1/00* (2006.01)

(52) U.S. Cl. ............. 201/15; 201/21; 201/25; 585/241

(58) Field of Classification Search .......... 201/15, 201/21, 25; 585/241
See application file for complete search history.

(56) References Cited

U.S. PATENT DOCUMENTS

| | | | |
|---|---|---|---|
| 4,008,053 A | | 2/1977 | Brenneman et al. |
| 4,208,252 A | | 6/1980 | Yoshida et al. |
| 4,384,923 A | * | 5/1983 | Hillekamp ............ 588/321 |
| 4,968,463 A | | 11/1990 | Levasseur |
| 5,340,036 A | | 8/1994 | Riley |
| 5,369,947 A | | 12/1994 | Dummersdorf et al. |
| 5,432,276 A | * | 7/1995 | Moens ............ 536/128 |
| 5,705,216 A | | 1/1998 | Tyson |
| 5,771,821 A | | 6/1998 | Zhuravsky et al. |
| 5,772,134 A | | 6/1998 | Bouldin et al. |
| 6,290,885 B1 | | 9/2001 | Roetheli et al. |
| 6,627,676 B1 | | 9/2003 | George et al. |
| 6,845,869 B1 | | 1/2005 | Graf von Deym et al. |
| 7,101,164 B2 | | 9/2006 | Bouldin |

FOREIGN PATENT DOCUMENTS

| | | |
|---|---|---|
| DE | 4320440 A1 | 12/1994 |
| EP | 0369351 A2 | 5/1990 |
| EP | 0542458 A | 5/1993 |
| EP | 0591703 A2 | 4/1994 |
| FR | 2689041 A | 10/1993 |
| WO | WO 89/12086 A | 12/1989 |

(Continued)

OTHER PUBLICATIONS

Nabil W. Said, "Extrusion of Alternative Ingredients: An Environmental and a Nutritional Solution," JAPR, 1996 Applied Poultry Science, Inc., pp. 395-407.

*Primary Examiner* — N. Bhat
(74) *Attorney, Agent, or Firm* — George R. McGuire; David B. Woycechowsky; Bond Schoeneck & King (57) ABSTRACT

Waste processing system, for performing a waste processing process, the system including a shredder, a grinder and a steam explosion device such as a cooking extruder. The waste processing system is used to process raw waste, such as consumer waste, into an end product such as pellets. The waste processing includes an acid treatment step to sanitize, purify and/or increase a cellulose content of the waste. The acid is preferably a weak acid and/or an organic acid.

13 Claims, 10 Drawing Sheets

FOREIGN PATENT DOCUMENTS

| WO | WO92/07049 | 4/1992 |
| WO | WO 94/20232 A | 9/1994 |
| WO | WO01/32715 A1 | 5/2001 |
| WO | WO02/16500 A1 | 2/2002 |
| WO | WO 2004/078879 A | 9/2004 |
| WO | WO 2005/028593 A | 3/2005 |

* cited by examiner

WASTE PROCESSING PROCESS USING ACID

RELATED APPLICATION

The present application claims priority to: (i) U.S. provisional patent application No. 60/955,114, filed on Aug. 10, 2007, (ii) U.S. provisional patent application No. 60/986,372 filed Nov. 8, 2007, (iii) U.S. provisional patent application No. 61/048,006 filed Apr. 25, 2008, and (iv) U.S. provisional patent application No. 61/047,993 filed on Apr. 25, 2008; all of the foregoing patent-related document(s) are hereby incorporated by reference herein in their respective entirety(ies).

BACKGROUND OF THE INVENTION

1. Field of the Invention

The present invention relates to waste processing systems and more particularly to waste processing systems for processing consumer waste (see DEFINITIONS section).

2. Description of the Related Art

Conventionally, one of the most common methods of disposing of consumer wastes is the deposition of such wastes on land or in landfills. In the United States, such landfills generally are the repositories of more than ninety percent of consumer waste. In the United States, incineration is another conventional waste processing method. Incineration is used to dispose of most of the remaining ten percent of consumer waste. Another conventional waste processing method is composting. Composting of solid wastes is currently utilized in only insignificant amounts in the United States.

Given the above, the general viewpoint is that a properly designed landfill is the cheapest satisfactory means of disposal for consumer waste. However, this is only the case if suitable land is located within a convenient range of the source of the consumer waste. Typically, collection and transportation costs account for approximately seventy-five percent of the total cost of consumer waste management. The transportation cost is likely to rise in the future, with rising energy costs, and thereby make landfill disposal relatively more expensive.

In modern landfills, consumer waste is usually spread in thin layers, each of which is compacted by heavy industrial equipment, such as bulldozers, before the next layer is spread on top. When about 3 meters of consumer waste has been laid down, it is covered by a thin layer of clean earth, which is then also compacted. Pollution of surface and groundwater is generally managed by lining and contouring the fill, compacting and planting suitable cover, selecting proper soil, diverting upland drainage, and placing wastes in sites not subject to flooding or high groundwater levels. As is known, certain gases are generated in landfills due to the anaerobic decomposition of organic consumer waste. Since some of these gases are explosive in nature (for example, methane), it is important that such landfills have proper ventilation and/or methane disposal or capture systems.

Moving from landfill disposal to incineration disposal, incinerators of conventional design burn consumer waste on moving grates in refractory-lined chambers. The combustible gases and the solids they carry are burned in secondary chambers. Combustion is eighty-five to ninety percent complete for any combustible materials present in the waste stream. In addition to heat, the products of incineration include the normal primary products of combustion including carbon dioxide and water, as well as oxides of sulfur and nitrogen and other gaseous pollutants. The non-gaseous products produced by incineration are fly ash and unburned solid residue. Emissions of fly ash and other particles are often controlled by wet scrubbers, electrostatic precipitators, and bag filters.

Therefore, landfill-based and incineration-based waste processing processes create significant environmental problems and concerns for any municipality, government, private industry, and/or individual involved in waste management activities. In light of the problems associated with the use of landfills and incineration methods, a trend has developed whereby the treatment and handling of consumer waste involves "resource recovery" type waste processing processes. Resource recovery waste processing systems attempt to recover useful materials from consumer waste and may include grinding or shredding machines, magnetic separators, air classification that separates the light and heavy fractions, screening, and/or washing. In other words, resource recovery type waste processing attempt to reduce (that is, recycle) the solid waste into a more manageable form, although this reduced form often has little to no practical utility.

Resource recovery waste processing can be generally considered as a thermal process. More specifically, it is a combustion process and/or a pyrolysis process. Pyrolysis, also called destructive distillation, is the process of chemically decomposing consumer wastes by the introduction of heat in an oxygen-reduced atmosphere. This process yields a gas stream containing primarily hydrogen, methane, carbon monoxide, carbon dioxide, and various other gases and inert ash, depending on the organic characteristics of the material being pyrolyzed.

One conventional resource recovery type of waste processing process for consumer waste is wet pulping process. In wet pulping process the incoming refuse is mixed with water and ground into a slurry in an apparatus referred to as a wet pulper, which is a machine similar to a large kitchen disposal unit. Large pieces of metal and other non-pulpable materials are separated by a magnetic separator, and the residue is used as fill. The slurry from the pulper goes into a centrifugal device called a liquid cyclone, which separates heavier non-combustibles such as glass, metals, and ceramics. The heavy portion of the slurry goes to a glass and metal recovery system. The lighter portion goes to a paper and fiber recovery system. Combustible residues are mixed with sewage sludge, mechanically dewatered, and incinerated. Noncombustible residues are used as fill.

U.S. Pat. No. 5,340,036 ("Riley") discloses a grinder for a sink opening that includes an upper grinding section and a rotatable shredder component.

According to U.S. Pat. No. 5,705,216 ("Tyson"), a Canadian company, Stake Technology, has used a modified version of steam explosion to delignify lignocellulosic material.

U.S. Pat. No. 5,772,134 ("Bouldin 1") discloses a grinding apparatus including a grinder for reducing the size of waste material, a series of conveyors, a shredder and at least one magnetic device.

U.S. Pat. No. 6,290,885 ("Roetheli") is directed to a waste processing system including steam explosion processing and the addition of plastic to the processing waste (see DEFINITIONS section). However, as Roetheli is understood, the plastic is added to the processing waste subsequent to the steam explosion process step.

U.S. Pat. No. 6,627,676 ("George") is directed to a waste processing system including plastic and a steam explosion process step. However, the plastic is added to the processing waste subsequent to the steam explosion process step.

U.S. Pat. No. 7,101,164 ("Bouldin 2") discloses a pressure vessel apparatus in the general nature of a hydrolyzer used for the reduction, decomposition, destruction and/or conversion (hereinafter "rendering") of organic wastes generated during meat and poultry production for human consumption.

An article entitled "Extrusion of Alternative Ingredients: An Environmental and a Nutritional Solution," by Nabil W. Said (the "Extrusion Article"), discloses that material has been processed in a dry extruder at elevated temperature and pressure so that cells are ruptured when the material leaves the extruder. According to the Extrusion Article, materials that have been processed in this manner include feathers, offal, turkey litter, broiler litter, partially dehydrated layer manure, farm mortalities, dissolved air flotation, restaurant grease, fish waste, eggshells, unsalable eggs, cheese trimmings, tallow and other food industry by-products.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

Some embodiments of the present invention are directed to waste processing processes that include an acid treatment step for purifying, sanitizing and/or increasing the cellulose content of the waste.

According to one aspect of the present invention, a waste processing process for processing waste, includes the steps of: (i) providing the waste; (ii) performing an initial processing step to convert the waste into an end-product; and (iii) pyrolyzing the end-product to form biogas. Step (ii), the initial processing step, includes the sub-step of treating the waste with acid.

According to a further aspect of the present invention, a waste processing process for processing waste, includes the steps of: (i) providing waste; (ii) dividing the waste; (iii) subsequent to the dividing step, treating the waste with acid; and (iv) subsequent to the treating step, extruding the waste.

According to a further aspect of the present invention, a process for processing waste includes the following steps: (i) providing waste; (ii) treating the waste with acid; and (iii) subsequent to the treating step, performing steam explosion processing on the waste.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 19:
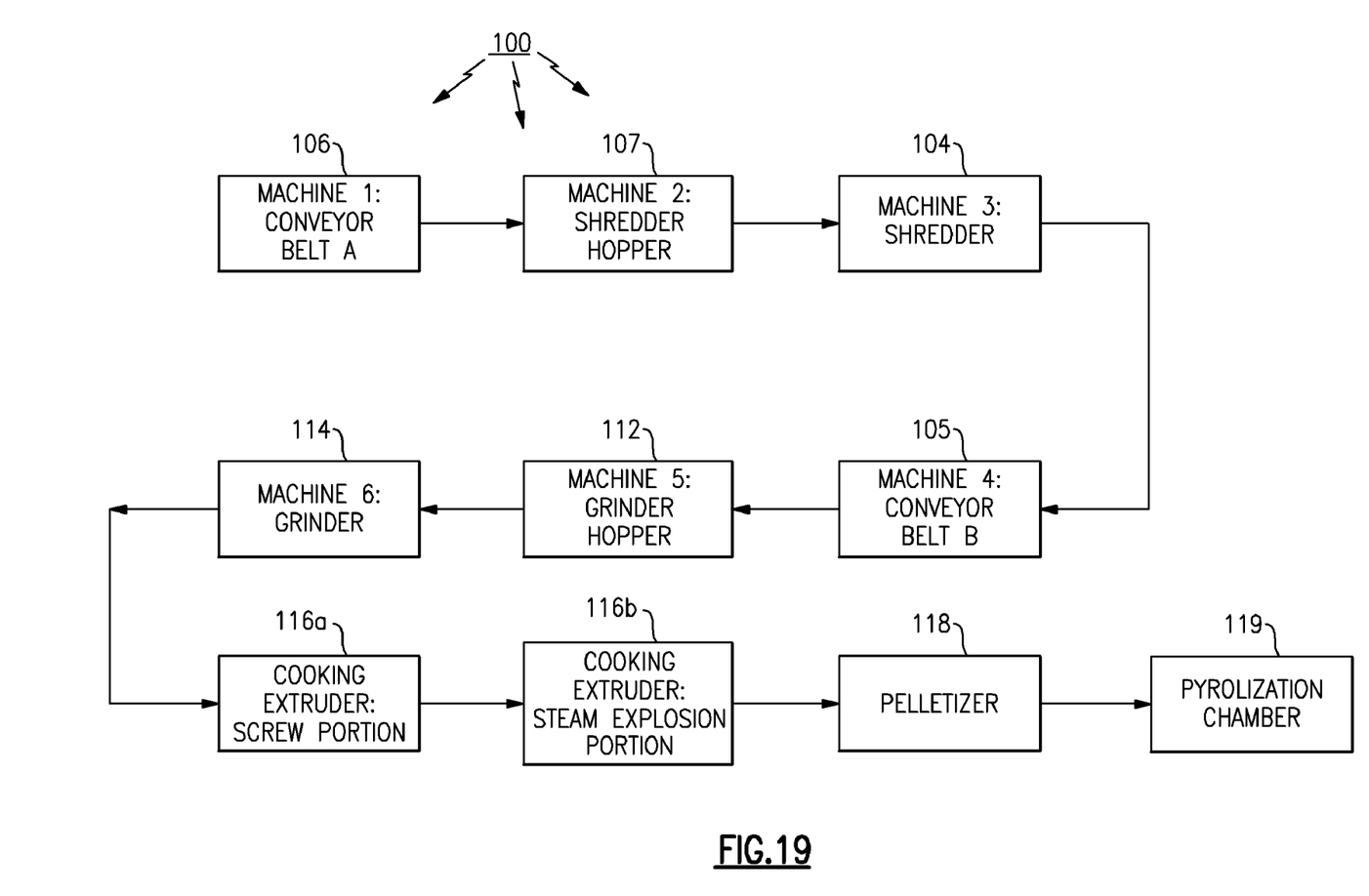
FIG. 19 is a schematic showing every machine in the first embodiment waste processing system.

First, preferred waste processing system(s) will be discussed in connection with FIGS. 3-19, followed by a discussion of preferred waste processing process(es). FIG. 19 shows a schematic of a first embodiment of waste processing system 100.

FIG. 19 shows a schematic of waste processing system 100 including: conveyor belt A 106; shredder hopper 107; shredder 104; conveyor belt B 105; grinder hopper 112; grinder 114; cooking extruder screw portion 116a; cooking extruder steam explosion processing portion 116b; and pelletizer 118. Raw waste, or raw consumer waste, is fed as an input into system 100. Preferably, any harmful materials are removed from the waste. Preferably, the raw waste is 12% to 18% plastic. More plastic may be added if a visual inspection indicates that insufficient plastic is present. Preferably, any added plastic is at least primarily in the form of high or low density polyethylene film. Preferably, any added plastic is added prior to shredding of the waste in shredder 107. Some of these components of system 100 will be discussed in more detail below.

Figure 10:
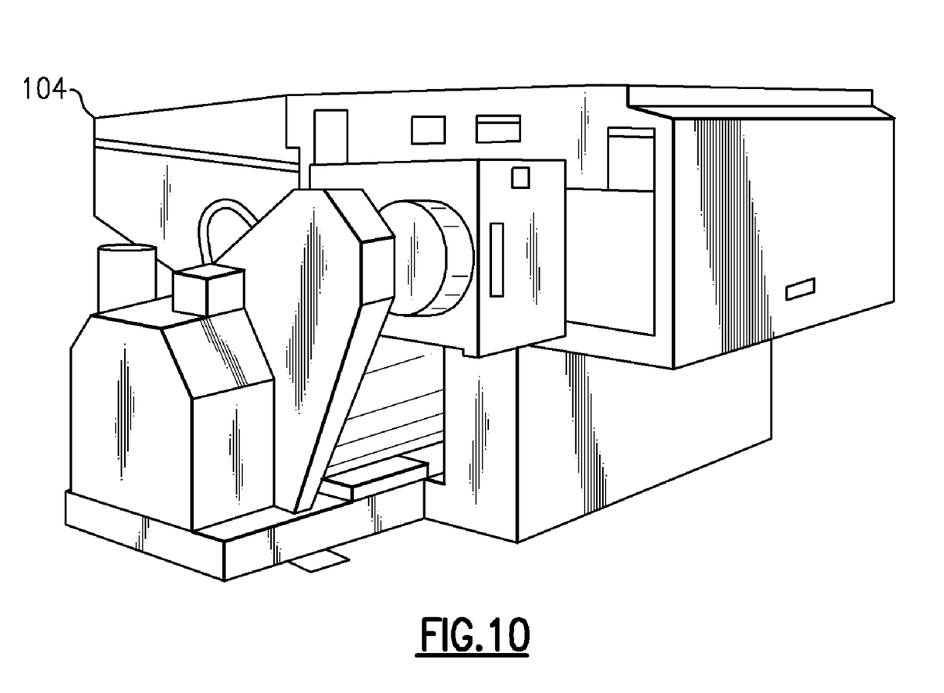
FIG. 10 is a perspective view of a first embodiment of a shredder for use in the first embodiment system.
Figure 11:
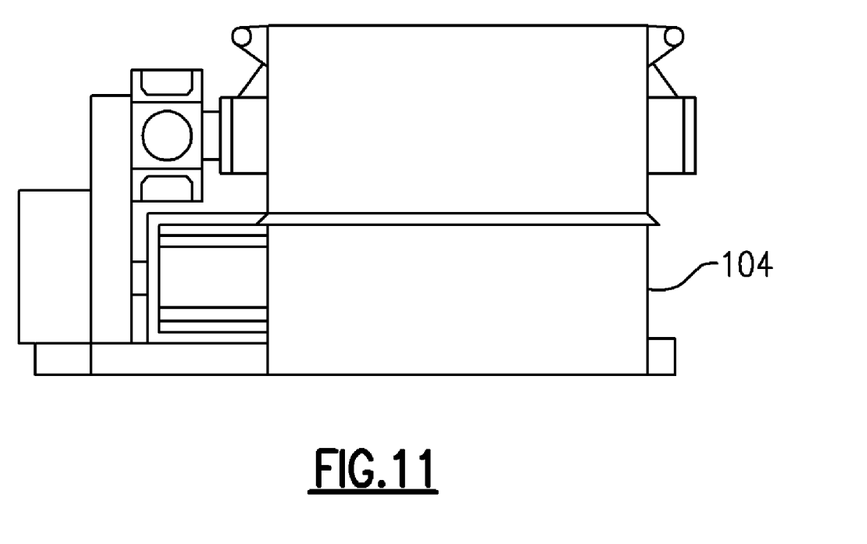
FIG. 11 is a front orthographic views of the first embodiment shredder.
Figure 12:
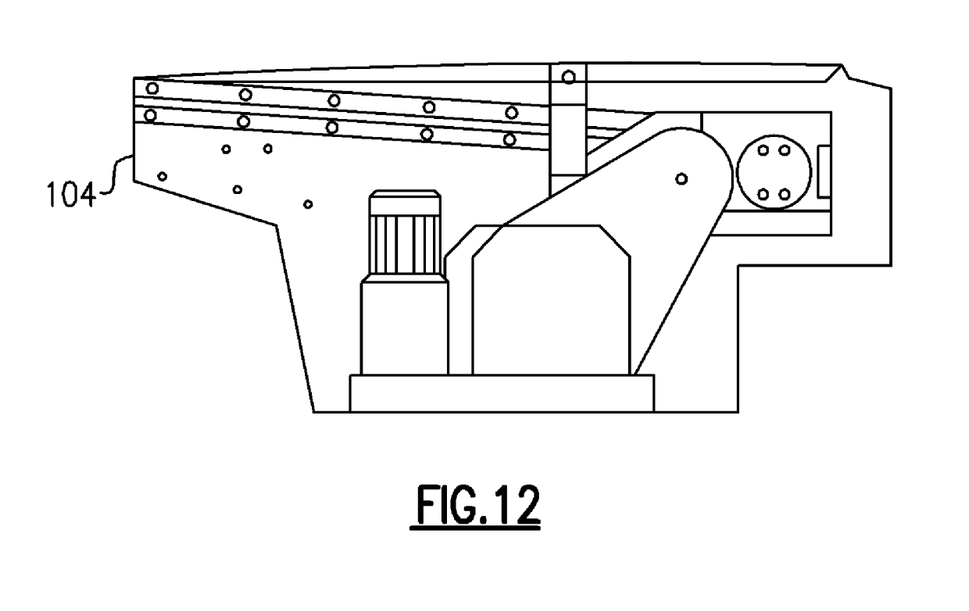
FIG. 12 is a side orthographic views of the first embodiment shredder.

FIGS. 10 to 12 show the appearance and some specifications for a preferred shredder (see DEFINITIONS section) 104 for use in system 100. One optional feature of the shredder is the use of an electricity conserving high torque electromagnetic motor. As shown in FIGS. 15 to 18, shredder 104 includes rotating shafts with cutting teeth attached to the shafts. Preferably there are four shafts, or rows, of cutting teeth and they intermesh mesh as shown in FIGS. 15 to 18. While shredder 104 is preferably a Vecoplan rotary waste shredder model number RG62/125-XL or RG622U-XL, many other shredders (see DEFINITIONS section) could be used, including, but not limited to shredders made by Saturn, Untha and SSI.

FIGS. 11 and 12 show two views of a Vecoplan Rotary Shredder RG62U-XL "Shorty" which includes the following preferred features: (i) low speed/high torque design; (ii) touch pad monitoring and control; (iii) easy accessibility; (iv) tramp metal protection; (v) low rpm; (vi) low noise; (vii) large infeed hopper; (viii) precision hydraulic process ram; (ix) 4-way indexable cutting inserts; (x) high output torsion point cutting rotor; (xi) heavy duty construction; (xii) rugged hydraulics; (xiii) stress-free frame; (xiv) robotically welded; (xv) oversized drivetrain; (xvi) heavy spherical roller bearings; (xvii) fluid turbocoupling; (xviii) PLC control panel; and (xix) ISO 9001 manufactured. Other preferred options include: (i) multiple rotor configurations; (ii) pneumatic pick-up hoods; (iii) custom hoppers; (iv) abrasion resistant screens; (v) control integration; and (vi) turnkey installation with custom conveyor systems, engineering and material handling equipment. Shredders for use with the present invention may have one or more of the following preferred specifications: (i) hopper opening 63 inches by 58 inches; (ii) hopper volume 4 cubic yards; (iii) rotor diameter 20 inches; (iv) number of cutters 45-74 (40×40); (v) rotor speed 120 rpm; (vi) drive motor horsepower 125-150 hp; (vii) two speed hydraulic feed ram; (viii) 10 hp hydraulic feed ram; (ix) machine weight 13,950-15,900 lbs.; and (x) voltage 460V/3 phase/60 hertz.

Figure 7:
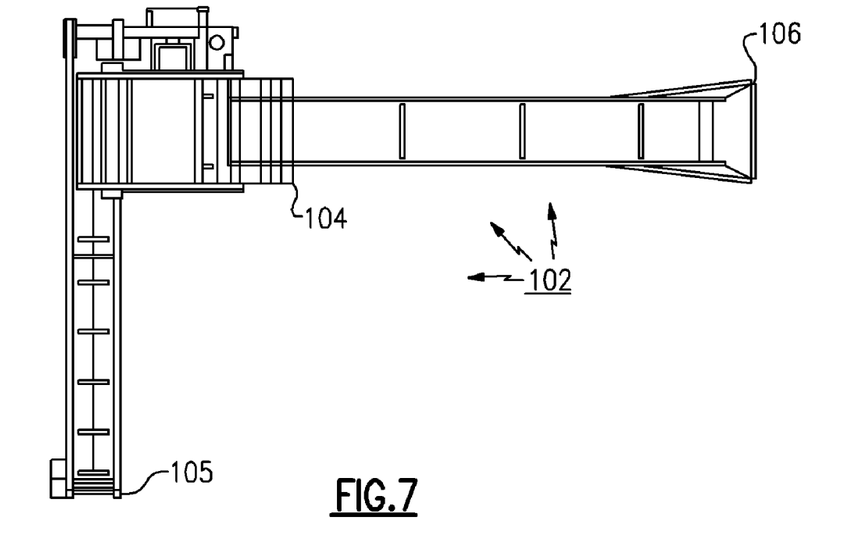
FIG. 7 is a top orthographic view of a first portion of the first embodiment system.
Figure 8:
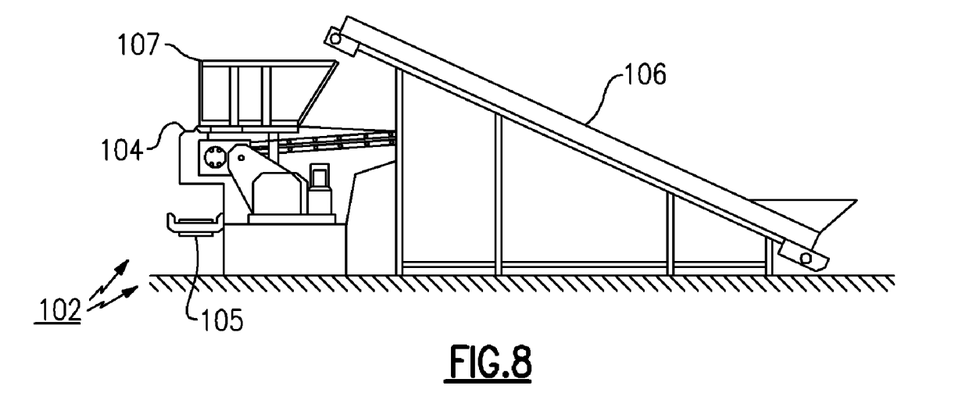
FIG. 8 is a side orthographic view of the first portion of the first embodiment system.
Figure 9:
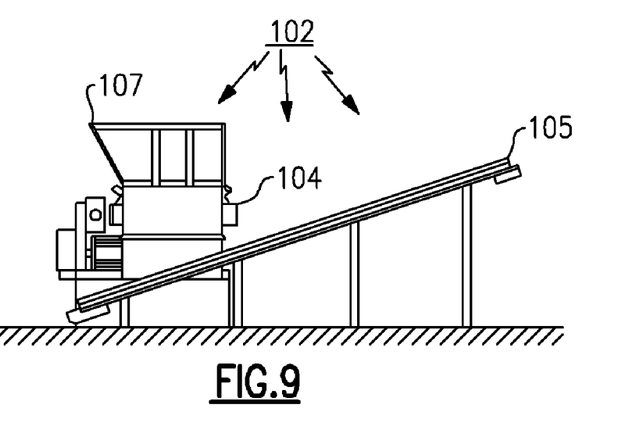
FIG. 9 is a front orthographic view of the first portion of the first embodiment system.

FIGS. 7 to 9 show a first portion 102 of system 100 for processing consumer waste (not shown). First portion 102 of system 100 includes: shredder 104; conveyor belt B 105; conveyor belt A 106 and shredder hopper 107. Some preferred dimensions are shown on FIGS. 7 to 9 for first portion 102 of system 100. The waste stream starts at the lower end (see FIG. 8) of conveyor belt B 106. Conveyor belt B carries the waste stream up to its upper end and dumps it into hopper 107. Hopper 107 feeds the waste stream by gravity down into the inside of shredder 104, which shreds the waste stream. The shredder then dumps the waste stream onto conveyor belt A 105, which carries the waste stream away from the shredder and to the second portion of system 100 (to be discussed below).

Shredder 104 preferably has a 30 inch machine base. Hopper 107 is preferably a standard G hopper. Conveyor belt B 105 is preferably a 24 inch wide by 24 foot long discharge conveyor with stainless steel trough. Conveyor belt A 106 is preferably a 36 inch wide by 26 foot long infeed conveyor.

Figure 13:
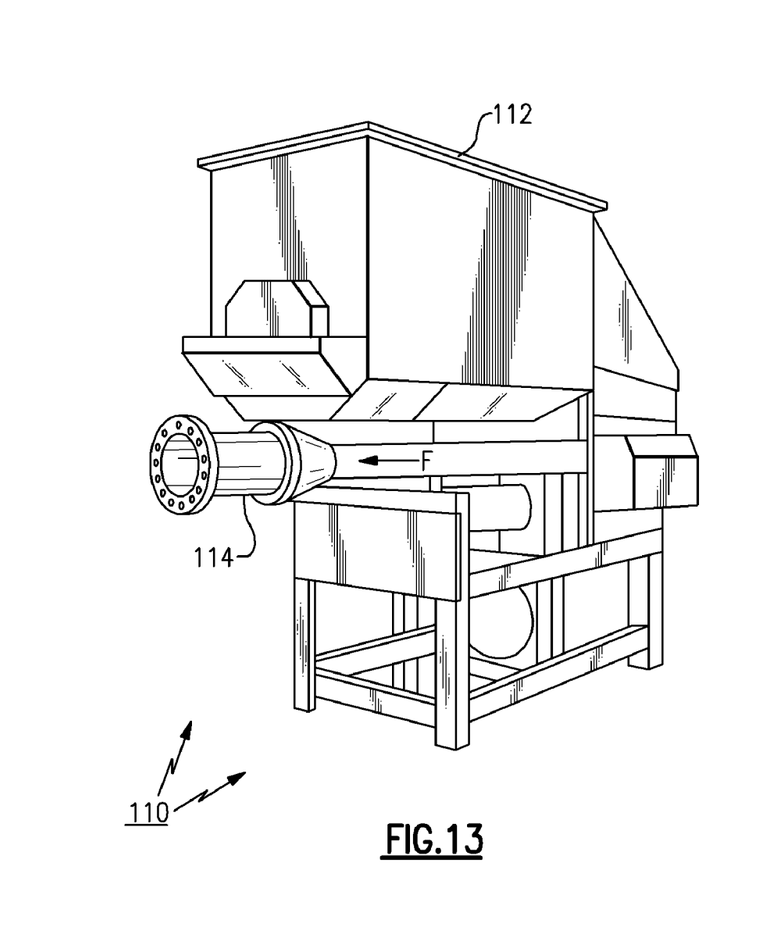
FIG. 13 is a perspective view of a first embodiment of a grinder assembly for use in the first embodiment system.
Figure 14:
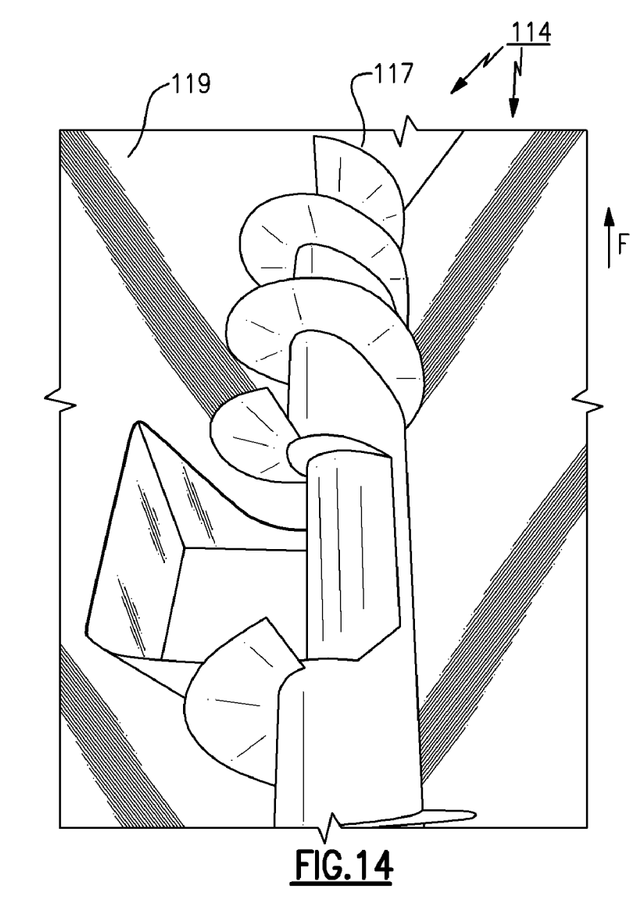
FIG. 14 is a cut-away perspective view of the screw of the first embodiment grinder assembly.
Figure 15:
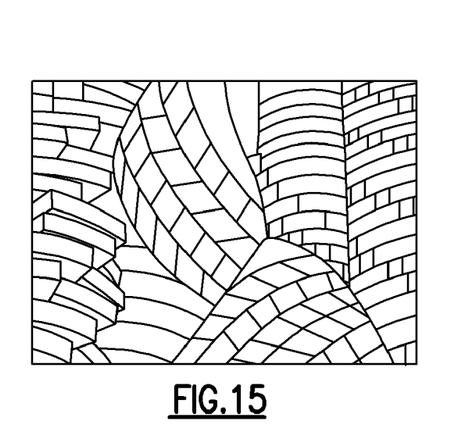
FIG. 15 is a perspective view of a portion of the first embodiment shredder.
Figure 16:
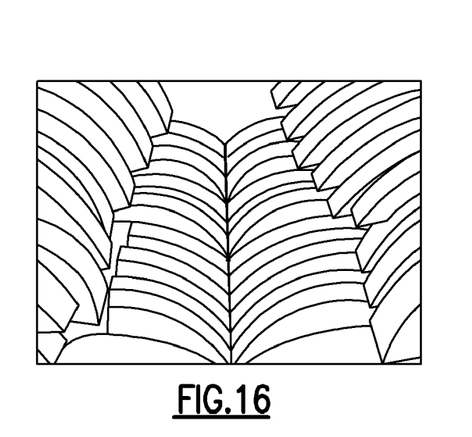
FIG. 16 is a perspective view of a portion of the first embodiment shredder.
Figure 17:
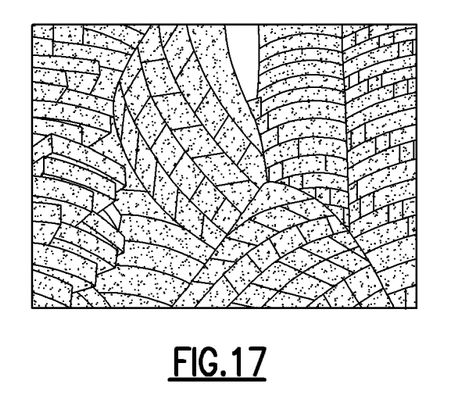
FIG. 17 is a perspective view of a portion of the first embodiment shredder.
Figure 18:
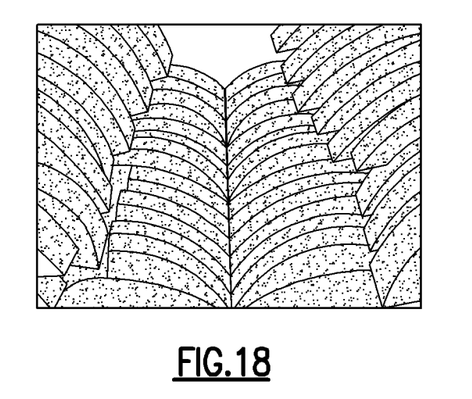
FIG. 18 is a perspective view of a portion of the first embodiment shredder.

FIGS. 3 to 6 show a second portion 103 of system 100 for processing consumer waste (not shown). Second portion 103 of system 100 includes meat grinder 110; cooking extruder 116; and pelletizer 118. Some preferred dimensions are shown on FIGS. 4 to 6 for second portion 103 of system 100. As shown in FIG. 13, meat grinder 110 includes hopper 112 and grinder screw assembly 114. The waste stream is fed from first portion 102 into hopper 112. The waste steam is then gravity fed down into grinder screw assembly 114, which grinds it. The waste stream is then extruded by cooking extruder 116. Then, the waste stem is fed into pelletizer 118 and pelletized.

As shown in FIG. 13, the grinder screw assembly includes Archimedean screw 117 and bladed tube 119. The Archimedean screw is located underneath the hopper so that after processing waste falls down through the hopper it is then pushed in the direction of arrow F (see FIGS. 1, 13 and 14) by rotation of the screw. As the processing waste is pushed in direction F, it abrades against blades affixed (preferably permanently affixed) to the bladed tube. The meat grinder type of grinding/mixing device is preferred for use with the present invention, although other types of grinders (see DEFINITIONS section) may be suitable. Meat grinder 110 reduces the particle size of the processing waste while making the resultant mass of processing waste more uniform prior to entering the cooking extruder. This is highly preferable because the processing waste includes both proteins and cellulosic materials. Meat grinder 110 distributes these as well as evenly distributing the plastic component of the processing waste. Meat grinder 110 (sometimes referred to as a granulator) preferably reduces particle size of the processing waste to 6 mm or less.

Use of the grinder according to the present invention homogenizes the processing waste and forms it into a hamburger like substance. In this form, the processing waste feeds quickly and uniformly into the cooking extruder (at its extruder mouth). This can prevent problems where the processing waste is low in bulk density, bridges or blocks the passageways through which the waste must pass and/or requires a plunger system to keep the passageway open. The grinder should be designed to solve any feeding problems.

The cooking extruder preferably adds controlled steam at its screw portion 116a to insure sufficient moisture in the processing waste and to help heat the processing waste in preparation for the steam explosion processing it is about to be subjected to. This addition of steam is preferred over steam explosion processing devices that require dry mixtures so that the mixture can be heated by friction. The screw of the screw portion must be designed to allow the addition of steam. In the screw portion 116a pressure and heat are brought to bear on the processing waste. The screw is designed to develop friction even in a relatively wet processing waste. It is noted that heat is preferably generated by a combination of steam and friction. One reason that it is preferred to use at least some steam heat is that waste, and especially consumer waste, tends to have a wide range of friction coefficients in its constituent materials. This non-uniformity in friction coefficients can result in uneven heating if friction alone is used to accomplish the heating.

The pelletizer may be an off-the-shelf pelletizer, but it is noted that it may be inventive to use a pelletizer specifically for pelletizing processing waste, and especially for processed waste end-product that is to be shipped and pyrolyzed. Generally, the end-product will be shipped because it is not necessarily efficient to provide a pyrolyzing chamber at every waste processing site. Several processing sites may feed a singly pyrolyzation chamber. According to the present invention, pelletized end-product: (i) is easy to handle; (ii) is easy to ship; (iii) has a relatively high bulk density (as compared to unpelletized "fluff" which has a form physically similar to sawdust or feathers); and (iv) reduces moisture absorption due to its compaction and low surface area ratio.

In some embodiments of the present invention, the end-product may not be pelletized, or pelletized only in part. For example, if a portion of the end-product is to be used to make construction materials instead of being pyrolyzed, then that portion may remain unpelletized, or might be pelletized only after the addition of additives designed to make the end-product more suitable for use as a construction material.

One preferred feature is to use an inverted cone passage between the screw portion 116a and the steam explosion processing portion (or chamber) 116b. The inverted cone helps generate back pressure and friction in the processing waste. Preferably, the processing waste is pressurized to about 40 atmospheres before it gets into the steam explosion chamber.

In the steam explosion chamber, the pressure drops, preferably to a value measured in negative atmospheres. This use of this much of a vacuum enhances the steam explosion so that the plastic is melted and the non-plastic fibrous mass in the processing waste is coated by the plastic component of the processing waste.

Figure 20:
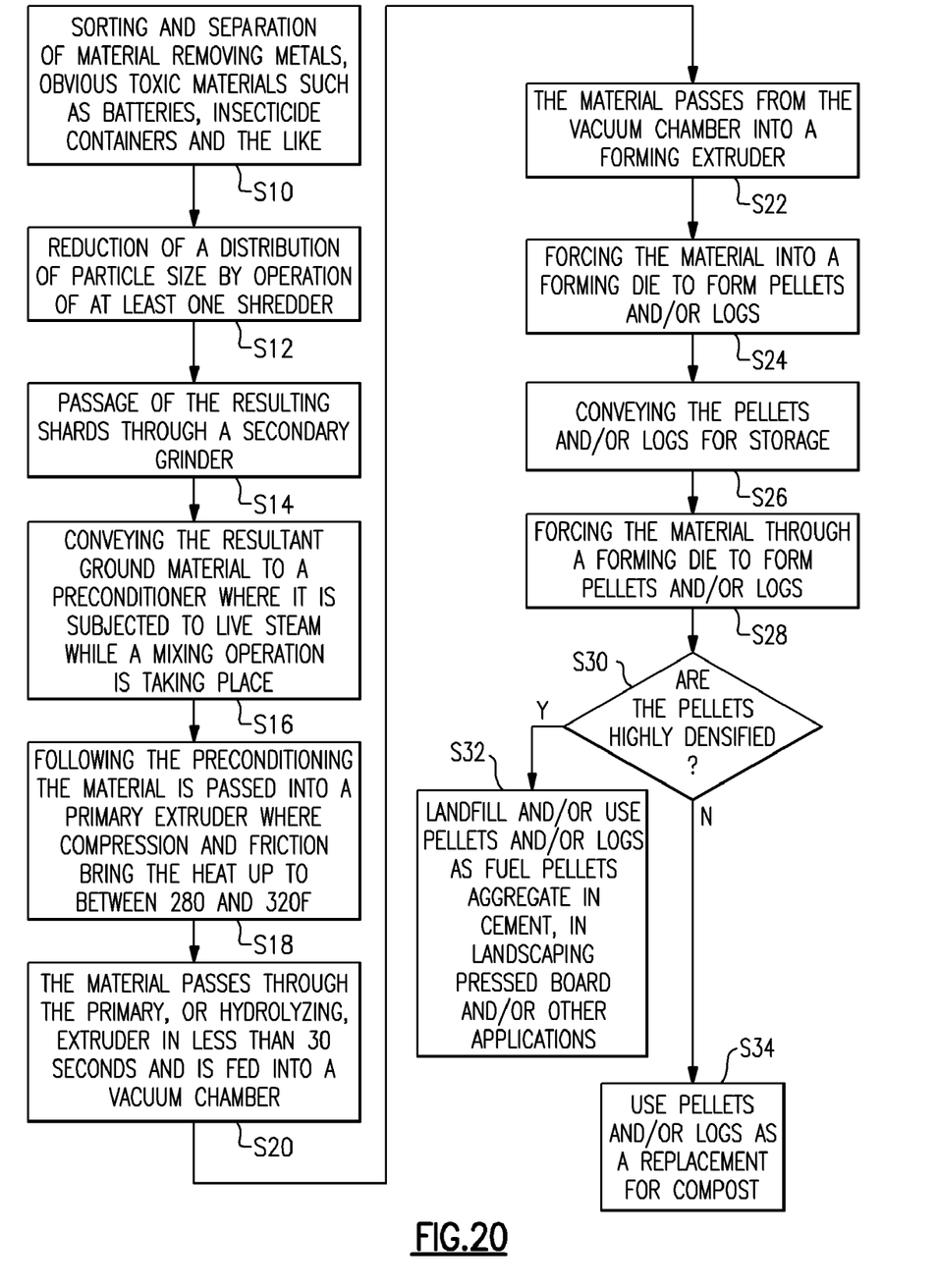
FIG. 20 is a flowchart showing an embodiment of a waste processing process.

Now that waste processing systems according to the present invention have been discussed, discussion will move to waste processing processes according to the present invention. FIG. 20 shows a flowchart, including steps S1, S12, S14, S16, S18, S20, S22, S24, S26, S28, S30, S32 and S34, which represents an exemplary process to illustrate the present invention.

With regard to step S16 it is noted that the solid waste (see DEFINITIONS section) product will vary from day to day and batch to batch, and a level of assurance must be achieved that all materials are pure and uniformly processed. The preconditioning enables the product to be sterilized on a continuous, straight-through basis therefore achieving higher volumes of quality product in less time than any other processing method.

With regard to step S18 it is noted that in the oxygen-free atmosphere, the heat and/or pressure produced in the primary extruder assures bacterial destruction, mold destruction, and yeast destruction, which would otherwise be detrimental to health and storage. Preferably, temperatures is increased in a short time (under 30 seconds), in conjunction with an increase of pressure to high pressure (estimated at 40 atmosphere) within an oxygen free atmosphere.

With regard to step S20, this extreme and sudden release from pressure which develops within the extruder causes the cells to expand and cell rupture to occur. Cells are ruptured when the product leaves the extruder. This rupture of cell walls by steam explosion processing (see DEFINITIONS section) frees moisture from inside the cells, yielding an easily dried waste stream. This produces several benefits. It ruptures the cell walls which allows water to steam off being exhausted through the vacuum, thereby drying the product up to 60%. In order for fiber to meet the mechanical property needs for composites the fiber must be as long as feasible. Steam explosion of the cells permit the fiber to untangle. The polyolefins in the mixture first melt and upon exploding uniformly intermix with and coat the cellulose fiber.

The primary extruder of step S20 is also sometimes referred to as a hydrolyzing extruder. Preferably the primary extruder is a friction extruder that generated heat by friction in the extruder. One manufacturer of friction extruders is Insta-Pro International of Des Moines Iowa. However, currently available friction extruders may require various modifications for operability and optimum performance in the process of the present invention. Such modifications may include: (i) brushless motor; (ii) screw design; (iii) use of stainless steel parts; (iv) machine instead of cast parts; and (v) depth of flight.

With regard to step S22, the forming extruder can be either twin screw or single screw. This extruder homogenizes, compacts and cools the extrudate before forcing it into a forming die at step S24. With regard to step S24, the forming die is specially designed to exert controlled resistance upon the extrudate. This is achieved by having conical openings which taper to a selectively adjustable opening of the final size. This has the effect of maximum packing density of the material into the pellet or log which results in a volumetric size reduction of up to 90% over the original solid waste material.

The pellets preferably produced at step S24 have several benefits over larger geometric shapes and sizes, such as the fact that they are easy to convey for further use. Alternatively, other shapes can also be produced with the extrudate at step S24.

The process of FIG. 20 may be modified by adding one or more acid treatment steps. Preferably, the acid treatment step(s) is performed after step S10 and prior to step S20. Even more preferably, it is done during or after step S14. This acid treatment step is discussed in further detail below in connection with the process embodiment of FIG. 1.

Other modifications to the above process may be preferred and/or needed, such as: (i) modification of compression areas; (ii) modification of amount of compression; (iii) speed control for motor(s); and (iv) modification to and/or addition of steam injection port.

Some advantageous features of the waste processing processes according to the present invention will now be discussed. The preferred waste processing process according to the present invention utilizes steam explosion of waste products in the presence of plastic as a way of distributing the plastic more evenly among the fibrous mass of the shredded and ground processing waste. In the most highly preferred embodiments of the present invention, the plastic is polyethylene obtained as PE film from the consumer waste stream itself. In alternative embodiments of the present invention, plastic may be added to the waste stream without limitation as to phase, shape or exact point in the process. However, even in embodiments where additional plastic is added to the processing waste, it is still preferred that this plastic be added before the steam explosion processing step, rather than after this step. Having the plastic in the processing waste stream before the steam explosion process step is different and better than convention steam explosion waste processing processes which either: (i) have no plastic at all; or (ii) add plastic after the steam explosion step.

When the steam explosion occurs at a temperature sufficiently high to melt the plastic, then the plastic is propelled outward and coats the fibrous mass. In processes of the present invention, it is highly preferred that the plastic be processed simultaneously and as a part of the processing waste biomass. It is preferable that the plastic present in the processing waste explode along with the fiber and become part of the fiber by its cohesion. This combination of plastic/cellulose fiber is highly advantageous. The processes according to the present invention can use a broad range of polyolefin plastic found in wastes. The extremes in temperature and pressure that happen during the steam explosion processing step will bond and explode the plastic and other waste fibers simultaneously so long as the plastic is present in the processing waste before it is subjected to the steam explosion processing step.

This co-refining of fibrous material and polyethylene plastic provides a coated fiber bundle which is useful because the cohesiveness permits it to be extruded and formed into pellets. These pellets are inert because bacteria and other organisms have been destroyed by the processing. The pellets are dry and their external surface is sealed against moisture and further bacterial attack. The high degree of uniformity obtainable with the present invention helps ensure a higher degree of inertness and dryness.

This high degree of dryness and inertness means that the end-product pellets can be stored and later utilized in a number of ways. One use is as feed stock for pyrolization into biogas. When a carbonaceous compound is subjected to elevated temperatures (for example, 2000 degrees F.) its chemical structure is affected. If this happens in the presence of oxygen then it will rapidly oxidize, or, in other words, it will burn. If, however, the biomass is exposed to the elevated temperature in the absence of oxygen, then it will decompose into useful gases such as methane. This can be achieved in a number of ways, through vacuum pumps or use of noble gases such as argon or helium, and/or by blocking entrance of oxygen into the pyrolization chamber. The preferred method for using the pellets is to form an airtight block at the gate of the pyrolization chamber. This is made possible through the prior treatment of the biomass, the attachment of the plastic to the fiber and the high degree of uniformity performing the steam explosion step in the presence of plastic.

The importance of the plastic can be better understood by thinking about the outcome if one were to shred and grind waste products into small particles and attempt pyrolization without the plastic. Without the plastic, there would be airflow (including an oxygen component) into the chamber because of the low bulk density and irregular shapes of the particles. There would be no airtight block at the gate of the pyrolization chamber.

Processed waste end-products formed according to the processes of the present invention generally possess one or more of the following beneficial characteristics: (i) high specific gravity; (ii) uniform shape; (iii) superior structural integrity; and/or (iv) less friable (that is, susceptible to crumbling). These beneficial characteristics are, of course, helpful with regard to many of the various possible uses of the processed waste end product. For example, in pyrolization uses, these characteristics help to provide an airtight lock as the pellets are being fed into the pyrolyzing chamber so that pyrolization proceeds with little or no oxidizing and with a reduced or eliminated need to resort to noble gasses.

Now that the preferred systems and processes according to the present invention have been discussed, discussion will move to alternative embodiments and/or additional aspects of the present invention. Initially, it should be noted that the processes and waste streams of the present invention can be conducted in either batch form, or in a continuous process depending upon the wants and desires of the user.

Figure 1:
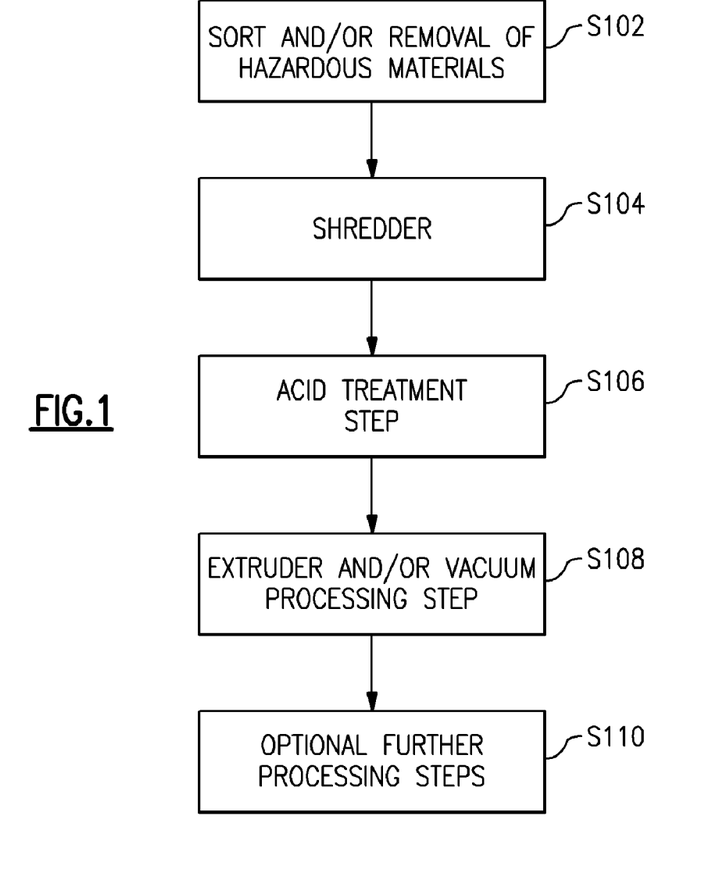
FIG. 1 is a flow diagram of a process in accordance with one embodiment of the present invention.

Turning to FIG. 1, FIG. 1 is a flow chart diagram of a process in accordance with one embodiment of the present invention. As can be seen in FIG. 1, the present invention begins with Step S102. In Step S102 some type of waste stream (e.g., garbage or some other type of municipal waste matter) is, if need be, subjected to a sorting, separation and/or removal step where any hazardous material, metal, glass and other large objects are removed so that the waste product can be subjected to further processing. Ideally, Step S102 is designed to remove as much inorganic material as possible, and in one embodiment as much large inorganic material as possible. The term "inorganic material" is meant to include, by way of example, large metal objects (e.g., cans, soda cans, paint cans, flatware, etc.), glass objects (e.g., glass jars, makeup bottles, glassware, etc.), and ceramic, masonry, or stone objects (e.g., dishware, hot plates, coffee cups, pottery, etc.). This inorganic material can itself be recycled, or if so desired subjected to some further processing step. Alternatively, the "inorganic portion" so collected could be sent to a conventional landfill for disposal.

At Step S102 other things may additionally be removed, for example, any depleted batteries, electronic devices, plastic-based articles, etc. for further recycling and/or other satisfactory disposal. In one embodiment, Step S102 is designed to remove at least about 60 weight percent of any inorganic and/or hazardous material that is present in the original waste stream. In another embodiment, Step S102 is designed to remove at least about 75 weight percent, at least about 90 weigh percent, at least about 95 weight percent, at least about 98 weight percent, or even at least about 99 weight percent, of any inorganic and/or hazardous material that is present in the original waste stream.

In another embodiment, Step S102 is designed to remove as much recyclable material as possible from the waste stream. Such materials can include, but are not limited to, batteries, metal objects (e.g., soda cans, food cans, etc.), recyclable paper and plastic products, etc.

After the sorting and/or removal step is completed, the remaining waste stream is primarily organic in nature. That is, in one embodiment, the remaining waste stream is primarily made up of paper products, food stuffs, and other organic-based waste products. This remaining waste stream is then transferred, either automatically or manually, to a shredder where in Step S104 it is subjected to shredding to produce a pulverized product.

With regard to Step S104, this shredding step can be accomplished by any suitable shredding means. Such means include, but are not limited to, introduction into a hammer mill, grinder, shredder or other material reduction apparatus (collectively referred to as a "shredder"). In one embodiment, the method of the present invention utilizes a commercial grinding apparatus designed to increase the surface area (that is, reduce the particle size) of the remaining organic waste stream.

As is previously mentioned, in Step S104 the remaining waste stream undergoes a surface area increase and an associated volume reduction, in that the material is pulverized, torn, or broken by a suitable shredding means to reduce its original particle size. In one embodiment, after Step S104 the waste stream typically has a surface area of at least about 1 $m^2$/kilogram. The surface area may be even greater, even up to 1,000 $m^2$/kilogram. The resultant ground waste material is in then transferred, either automatically or manually, to container designed to subject the contents thereof to an acid treatment step.

In Step S106, one or more acids are used to purify, treat, sanitize and/or increase the cellulose content of the ground waste material. Suitable acid compounds for use in this step include, but are not limited to, inorganic acids (for examples, hydrochloric acid, nitric acid, phosphoric acid) and organic acids (for examples, acetic acid, citric acid). In one embodiment, at least one weak acid (see DEFINITIONS section) is used in Step S106. Weak acids in water dissociate as shown in the formula below:

$$HA_{(aq)} \leftrightarrow H^+_{(aq)} + A^-_{(aq)}$$

The equilibrium concentrations of reactants and products are related by the acidity constant expression, ($K_a$):

$$K_a = ([H^+][A^-])/[HA]$$

The greater the value of $K_a$, the more the formation of H+ is favored, and the lower the pH of the solution. Preferably, the $K_a$ of acids used in processes according to the present invention is in the range of $1.8 \times 10^{-16}$ and 55.5. Acids with a $K_a$ less than $1.8 \times 10^{-16}$ are weaker acids than water. Acids with a $K_a$ of greater than 55.5 are strong acids and almost totally dissociate when dissolved in water. Organic acids are a large subset of weak acids. Common household weak acids include, but are not limited to, acetic acid, citric acid, boric acid and phosphoric acid.

Figure 2:
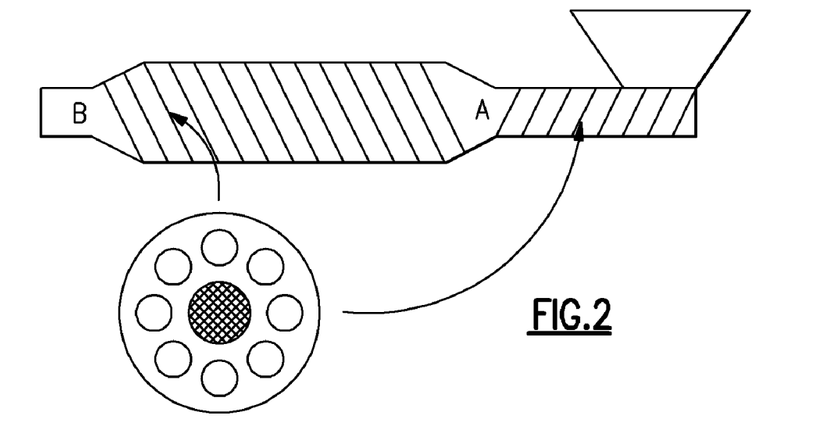
FIG. 2 is a cross-sectional view of an extruder and screw combination according to one embodiment of the present invention.
Figure 3:
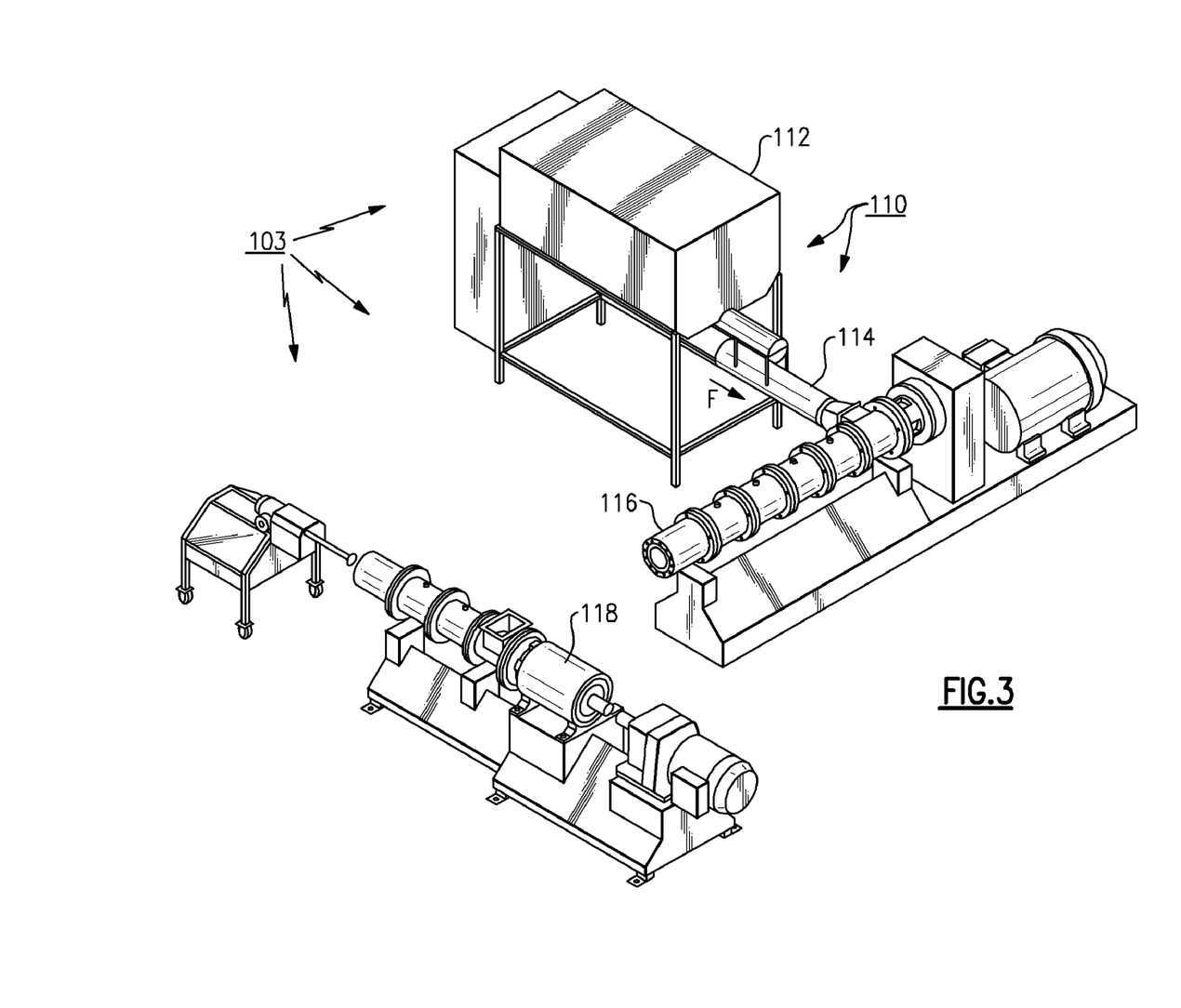
FIG. 3 is a perspective view of a second portion of a first embodiment of a waste processing system according to the present invention.
Figure 4:
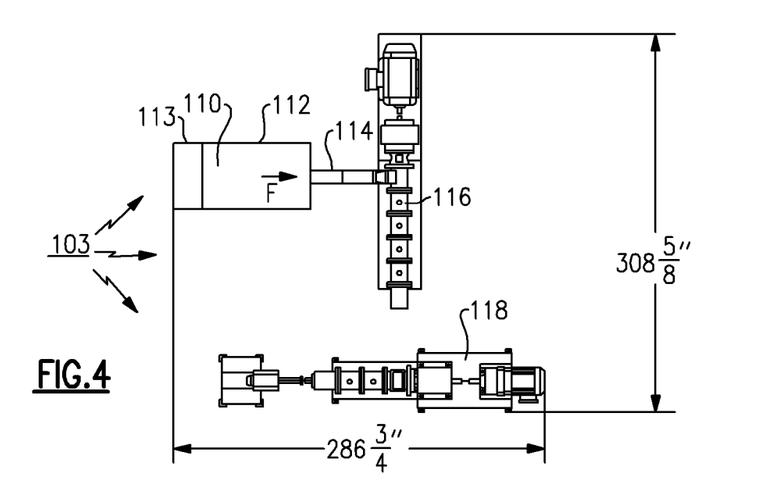
FIG. 4 is a top orthographic view of the second portion of the first embodiment system.
Figure 5:
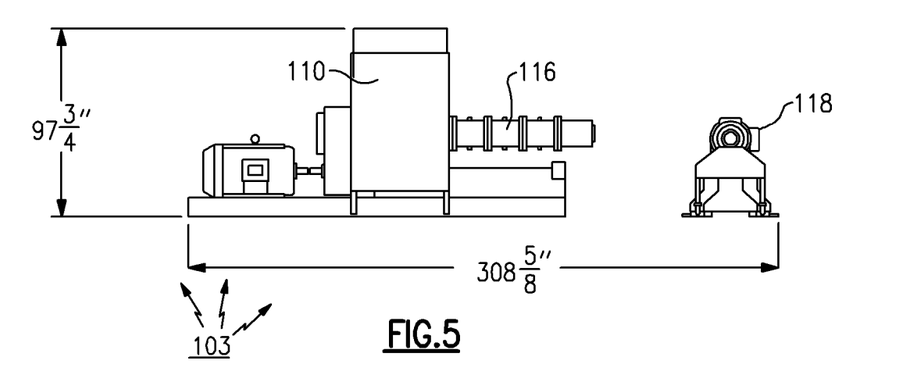
FIG. 5 is a front orthographic view of the second portion of the first embodiment system.
Figure 6:
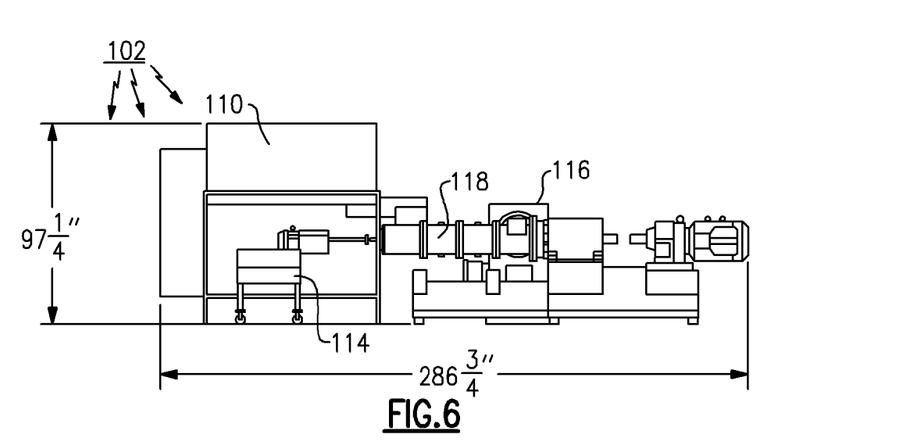
FIG. 6 is a side orthographic view of the second portion of the first embodiment system.

The resultant acid-treated ground waste material is then transferred, either automatically or manually, to an extruder designed to extrude the acid-treated ground waste material. In the extrusion step, Step S108, the acid-treated ground waste material is subjected to an extrusion process whereby the material is subject to any desired extrusion screw configuration. One exemplary screw configuration is shown in FIG. 2 where the screw configuration is designed to permit both forward flow and backward flow of the acid-treated ground waste material in order to facilitate the material folding back upon itself during Step S108, thereby causing the acid-treated ground waste material to undergo "purification" during Step S108. As can be seen from FIG. 2, a cross-sectional view of one suitable screw configuration for use in the extrusion step of the present invention is shown. Also shown in FIG. 2 is a cross-sectional view of the screw used in the extruder. It should be noted that although a screw configuration is shown in FIG. 2, the present invention is not limited thereto. Rather, any suitable screw configuration designed to permit reversing of the waste material through the extrusion process and/or the facilitation of back folding of the waste product during extrusion can be used in conjunction with the present invention. The term "back folding" means that within one or more areas within the length of the extrusion process, the waste material being subjected to extrusion undergoes turbulence and therefore some waste material is traveling in the forward direction of the extrusion process while some other portion of the waste material is traveling in the backward direction.

In this embodiment, the screw of FIG. 2 is designed and functions as follows. The screw is a multi-flighted screw with deep channels in order to maximize flow and minimize Jamming of any viscous materials in the waste material feed and is designed to advance the waste material feed forward. Furthermore, as will be explained below, the screw has eight flights therein that are, in this embodiment, aligned with the axis of rotation of the left-hand screw in the extruder of FIG. 2. In another embodiment, both screws of the extruder of FIG. 2 have such axially aligned flights positioned radially around the axis of rotation of an extruder screw.

Although the configuration of the extrusion process of FIG. 2 is shown with eight flights within the screw configuration, the present invention is not limited thereto. Rather, any suitable number of flights can be used. In this embodiment, the eight flights on the extruder screw helps to reverse the flow of waste material undergoing the extrusion process in order to facilitate the aforementioned back folding. As is noted above, this counter flow results in more efficient mixing and heat transfer during the extrusion step, step S108. The deepened screws are provided with a number holes around the circumference of the flight thereby permitting material transfer by flow through holes in the flights. The material that flows through the one or more flights (that is, holes) combines with the cooler material on the external surface of the screw. This generally takes place in areas A and B within the extruder as these areas are "open" areas between the two screws in the extruder of FIG. 2. However, as is noted above, the present invention is not limited to solely this extruder configuration.

Given the above extruder configuration, this action creates a hotter layer of material close to the barrel and improves the heat transfer and the thermal homogeneity in the screw channels. As such, the greater thrust of the shallower forward pushing screw flights keeps the waste material moving in an overall forward direction through the extruder thereby enabling the material to be discharged through one or more discharge ports at the end of the extruder.

In the extrusion step, Step S108 of the present invention, heat and pressure are applied to the waste material during the extrusion process to simulate autoclaving conditions. In one embodiment, when the waste material is passing through two screw portions of the extruder of FIG. 2, the material is under a pressure of about 1000 to 3000 psi and a temperature of about 200° C. to about 400° C.

In another embodiment, the pressure within the screw portions of the extruder during extrusion is in the range of about 1500 to about 2500 psi, or even from about 1750 to about 2250 psi. In another embodiment, the pressure in the screw portions of the extruder during extrusion is about 2000 psi. In another embodiment, the temperature during extrusion is in the range of about 250° C. to about 350° C., or even about 275° C. to about 325° C. In another embodiment, the temperature during extrusion is about 300° C. It should be noted that here, as well as elsewhere in the specification and claims, individual range limits can be combined to form alternative range limits.

Due to the lack of screws in areas A and B, the pressure in these areas is, in one embodiment, in the range of about 500 to about 900 psi, or from about 600 to about 850 psi, or even from about 700 to about 800 psi. In another embodiment, the pressure in areas A and B of the extruder of FIG. 2 is about 800 psi.

In another embodiment, the present invention utilizes an expeller such as a "hard press" or screw press in Step S108. The hard press or screw press, typically, has a material inlet and a material exit. The acid-treated ground waste material is introduced into the expeller where the internal screw-like shaft serves as a ram to shuttle the acid treated ground waste material along an internally tapered tunnel. Thus, as the tunnel is restricted the acid-treated ground waste material is squeezed within the confines of the tunnel to force moisture from the acid-treated ground waste material prior to its exit from the expeller.

In this embodiment, the expeller is designed to, among other things, remove water and liquid substances from the acid-treated ground waste material. Oils are known to impede the process of disassociating the useful cellulose compounds from the waste material. Since liquids can only be removed together and separated later, this embodiment can be used to remove as much liquid as possible from the acid-treated ground waste material.

When the acid-treated ground waste material exits the extruder and/or expeller, depending upon the application, the waste material is, in one embodiment, reduced in volume in the range of about 30% to about 75% and has a moisture index in the range of about 15% to about 40%.

After completion of extrusion Step S108, the extruded material can be further treated in Step S110 to yield mulch, animal bedding, compost soil, or even fill material for building products, lumber-based products or other wood-like products. Such treatment processes include, but are not limited to, palletizing, mixing, further extrusion processes, etc.

DEFINITIONS

The following definitions are provided to facilitate claim interpretation and claim construction:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

Consumer Waste: any household waste, office waste and/or retail waste; commonly called "trash" or "garbage"; includes waste resulting from durable goods (for example, tires, furniture), nondurable goods (for example, newspapers, plastic plates/cups), containers and packaging (for example, milk cartons, plastic wrap), post industrial waste, post commercial waste, and other wastes (for example, yard waste, food); but does not include industrial waste, hazardous waste and construction waste.

Grinder: any device for dividing waste in any manner, such as cutting, abrading, or tearing where there is screen control for particle size; grinders include, but are not limited to, grinders with an Archimedean screw that pushes waste through a bladed tube.

Processing Waste: any waste that is undergoing a waste processing process; during the time a waste stream is being processed from raw waste until it finished processing and is the end-product, the waste stream would be referred to as processing waste, or a processing waste stream.

Shredder: any device for dividing waste in any manner, such as cutting, abrading, or tearing where there is no screen control for particle size; shredders include, but are not limited to, shredders with intermeshing rows of teeth on rotating shafts.

Steam explosion processing: any processing which causes cell walls to rupture due to elevated temperatures and a sudden decrease in pressure, including, but not limited to a process where the cells are brought to a high temperature and high pressure in an extruder and then transferred to a chamber with a low pressure environment, such as a vacuum chamber.

Waste: any household waste, office waste and/or retail waste; commonly called "trash" or "garbage"; includes waste resulting from durable goods (for example, tires, furniture), nondurable goods (for example, newspapers, plastic plates/cups), containers and packaging (for example, milk cartons, plastic wrap), post industrial waste, post commercial waste, and other wastes (for example, yard waste, food); but does not include industrial waste, hazardous waste and construction waste.

Weak acid: Any acid that does not ionize in solution to a significant extent; if a weak acid is represented by the general formula HA, then in aqueous solution a significant amount of undissociated HA still remains.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A waste processing process for processing waste, the process comprising the steps of:
   providing the waste;
   performing an initial processing step to convert the waste into an end-product, with the initial processing step including the sub-step of treating the waste with acid and the sub-step of running the waste through a cooking extruder to simultaneously heat the waste, add moisture to the waste, increase the pressure of the waste and mix the waste; and
   pyrolyzing the end-product to form biogas;
   wherein the waste is consumer waste that includes both a plastic component and an organic matter component.

2. The process of claim 1 wherein the acid is added at a sufficient quantity and at a sufficiently low pH to:
   purify the waste, sanitize the waste and/or increase the cellulose sub-component of the waste.

3. The process of claim 1 wherein the acid is a weak acid, wherein a $K_a$ of the weak acid is in the range $1.8 \times 10^{-16}$ and 55.5, and wherein the weak acid is an organic acid.

4. The process of claim 1 wherein the performing step further comprises the sub-step of running the waste through a cooking extruder to simultaneously heat the waste, add moisture to the waste, increase the pressure of the waste and mix the waste.

5. The process of claim 4 wherein, the running through the cooking extruder sub-step:
   reduces the volume of the waste in the range of by about 30% to by about 70%; and
   causes the waste to have a moisture index of about 15% to about 40%.

6. A waste processing process for processing waste, the process comprising the steps of:
   providing waste;
   dividing the waste;
   subsequent to the dividing step, treating the waste with acid; and
   subsequent to the treating step, running the waste through a cooking extruder to simultaneously heat the waste, add moisture to the waste, increase the pressure of the waste and mix the waste.

7. The process of claim 6 wherein the waste is consumer waste.

8. The process of claim 6 wherein the waste includes cellulose.

9. The process of claim 8 wherein the acid is added at a sufficient quantity and at a sufficiently low pH to: purify the waste, sanitize the waste and/or increase the cellulose sub-component of the waste.

10. The process of claim 8 wherein the acid is a weak acid.

11. The process of claim 10 wherein a $K_a$ of the weak acid is in the range of $1.8 \times 10^{-16}$ and 55.5.

12. The process of claim 10 wherein the running through the cooking extruder sub-step:
   reduces the volume of the waste in the range of by about 30% to by about 70%; and
   causes the waste to have a moisture index of about 15% to about 40%.

13. A process for processing waste comprising the following steps:
   providing waste with the waste including cellulose and plastic;
   treating the waste with acid;
   subsequent to the treating step, performing steam explosion processing on the waste; and
   subsequent to the performing step, yielding at least one of: fill for building products, lumber-based products and/or wood-like products.

* * * * *